No. 641,938. Patented Jan. 23, 1900.
C. S. COX.
RAISIN SEEDER.
(Application filed Jan. 28, 1899.)
(No Model.) 2 Sheets—Sheet 1.
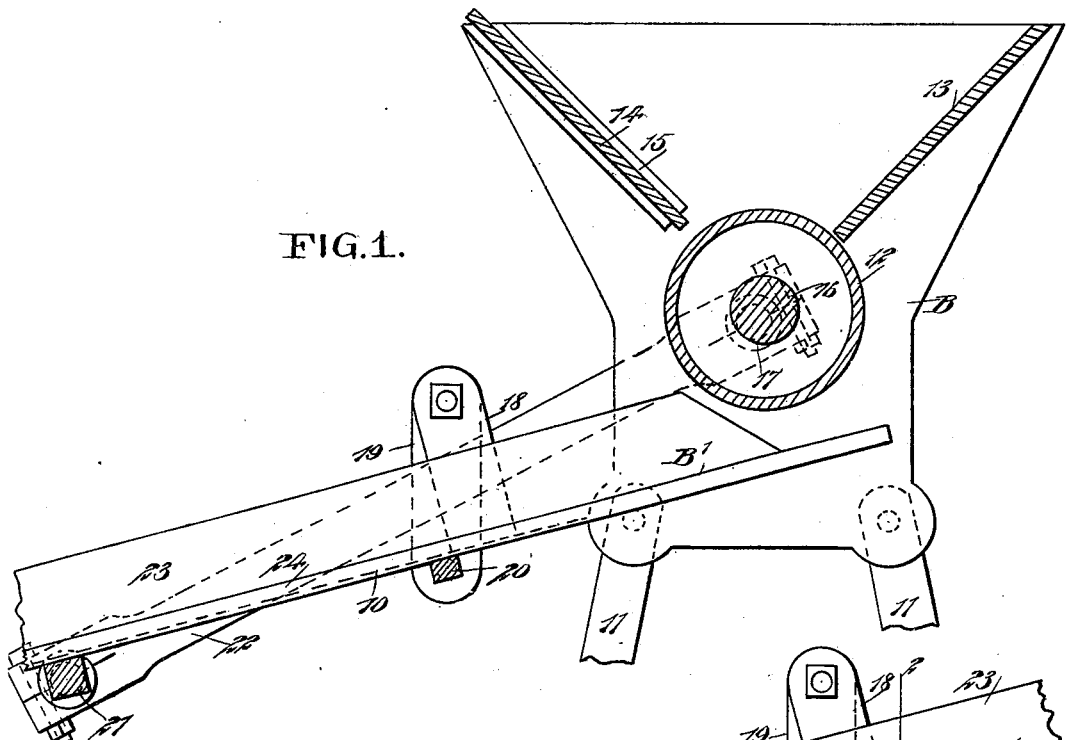
FIG. 1.
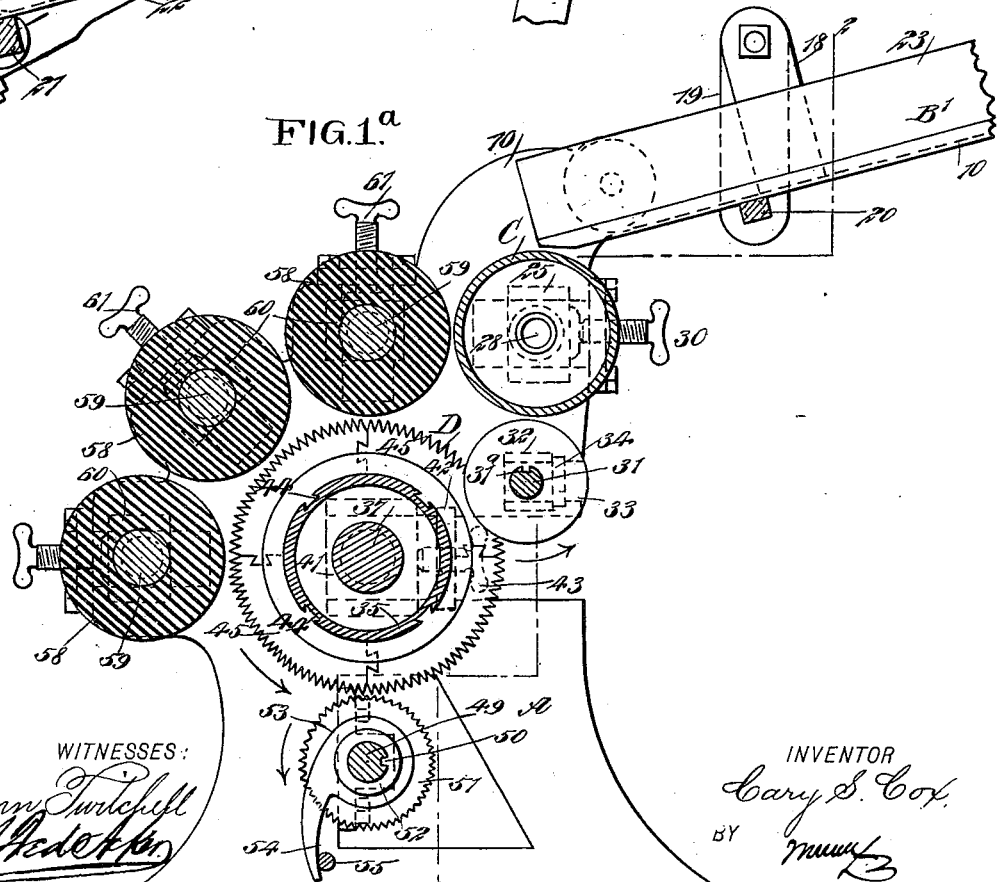
FIG. 1.ª
WITNESSES:
INVENTOR
Cary S. Cox.
BY
ATTORNEYS.
THE NORRIS PETERS CO., PHOTO-LITHO., WASHINGTON, D. C.

No. 641,938. Patented Jan. 23, 1900.
C. S. COX.
RAISIN SEEDER.
(Application filed Jan. 28, 1899.)

(No Model.) 2 Sheets—Sheet 2.

WITNESSES:

INVENTOR
Cary S. Cox
BY
ATTORNEYS.

UNITED STATES PATENT OFFICE.

CARY S. COX, OF FRESNO, CALIFORNIA.

RAISIN-SEEDER.

SPECIFICATION forming part of Letters Patent No. 641,938, dated January 23, 1900.

Application filed January 28, 1899. Serial No. 703,678. (No model.)

*To all whom it may concern:*

Be it known that I, CARY S. COX, of Fresno, in the county of Fresno and State of California, have invented a new and Improved Raisin-Seeder, of which the following is a full, clear, and exact description.

The object of the invention is to provide a raisin-seeder with a reciprocating screen so constructed that nails and other foreign matter may be separated from the fruit before the fruit reaches the seeding-section of the machine.

A further object of the invention is to provide the means for heating the raisins to be seeded before they reach the seeding apparatus, the heating of the raisins softening them, rendering them more pliable, and also facilitating the extraction of the seeds. The heating device employed also avoids the necessity of steaming or wetting the raisins before they are placed in the seeder, and consequently, through the medium of the improved seeder, a higher grade of product is obtained, and, furthermore, the product is not sticky or gummy.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through the hopper of the machine and the portion of the sieve connecting with the hopper. Fig. 1ª is a longitudinal vertical section through the body of the machine, being taken practically on the line 1ª 1ª of Fig. 2. Fig. 2 is a vertical transverse section through the body of the machine, taken substantially on the line 2 2 of Fig. 1ª. Fig. 3 is a detail longitudinal section through a portion of the carrying-roll and a portion of the brushes used in connection with said carrying-roll. Fig. 4 is a transverse section through the body portion of the carrying-roll, illustrating a segment of a saw or seed carrier attached thereto; and Fig. 5 is a vertical section through one of the shafts, illustrating one of the brushes for the carrying-roll in position thereon.

A represents the frame of the body of the machine, which consists of two vertical side pieces that are connected or braced in any suitable or approved manner.

B represents a hopper that is removed some distance from the frame A and is at a greater elevation than the upper portion of the said frame. The hopper B is connected with the frame by side pieces 10. (Shown in dotted lines in Figs. 1 and 1ª and in transverse section in Fig. 2.) The hopper is preferably supported by means of suitable legs 11, and within the hopper a drum 12 is mounted to revolve, adapted to receive the raisins to be seeded and conduct them to a reciprocating screen B'. The upper portion of the hopper is inclined in direction of the drum 12, such inclination being produced by employing a fixed back board 13, inclined from the top downwardly and inwardly, and an opposite front board 14, that is given a like inclination, but is adjustable in slideways 15. These front and back boards direct the raisins to the drum 12, the inner or lower ends of the boards being adjacent to the upper portion of the said drum, and the amount of raisins fed to said screen B' of the drum is regulated by the manipulation of the adjustable front board 14. The shaft 16 of the drum 12 is provided at each of its outer ends with a crank 17, and uprights 18 are secured to the side boards 10, connecting the hopper with the body of the machine, the said uprights being in pairs, and preferably one pair of uprights is located near the hopper and the other pair near the body of the machine, as shown in Figs. 1 and 1ª. Each upright is pivotally connected at its upper end to a link 19, and the pairs of links are connected at their lower ends by a cross-bar 20. The screen B' rests upon or is attached to the cross-bars 20, connecting the links, and said screen is further connected with or rests upon a third cross-bar 21, intermediate of the cross-bars 20, the cross-bar 21 being attached at its ends to pitmen 22, said pitmen being likewise mounted upon the cranks 17 of the drum-shaft 16, as is shown in Fig. 1.

The forward or upper end of the screen B' is located immediately below the drum 12 in the hopper, and the said screen is of less width than the width of the space between the side bars 10, connecting the hopper with the frame A, as is illustrated in Fig. 2. The screen B' consists of side pieces 23 and a bottom that is constructed of a series of longitudinal bars 24, A-shaped in cross-section, the bars being attached to or made to rest upon the cross-bars 20 and 21. A space intervenes the various bottom bars 24 of the sieve, said spaces being of sufficient width to permit of nails or other foreign matter being discharged from the screen while the raisins are passing down the screen, the screen being reciprocated by the rotation of the shaft 16, which may be accomplished in any desired way.

In the construction of the body portion of the machine a hollow heating drum or roll C is employed, located immediately beneath the delivery end of the screen B'. The trunnions of the heating-roll are journaled in boxes 25, mounted in the frame A, as shown in Fig. 2, one trunnion, 26, being usually solid and the other trunnion, 27, tubular, in order that a pipe 28, connected with a source of steam-supply, may be introduced through the hollow trunnion into the interior of the said heating-roll, the pipe 28 being provided with a suitable valve 29. Set-screws 30 are attached to the boxes 25, provided for the heating-roll, as shown in Fig. 1ª, in order that the said boxes may be laterally adjusted.

Immediately below the heating-roll C a shaft 31 is journaled in suitable boxes 32, removably located in the frame A. The shaft 31 is provided with a longitudinal keyway 31ª, as shown in Figs. 1ª and 3. A series of disks 33 is mounted upon the shaft 31, each disk being provided with a feather adapted to enter the keyway 31ª, and the boxes 32 are held in position on the shaft 31 by plates 34, slid through the members of the frame A to an engagement with the rear portions of the boxes, and when the said plates are removed the boxes and shaft and the disks carried thereby may be removed from the frame A. The disks 33, when mounted on the shaft 31, constitute what may be termed a "releasing" device, since the said disks 33 are adapted to enter the seed-retaining sections of a carrying-roll to be hereinafter described, which latter roll is adapted to receive the raisins and extract the seeds therefrom, the releasing device serving to disengage the seeded raisins from the carrying-roll. This releasing device, however, does not constitute a feature of my invention, as any adaptable device may be substituted therefor; but when the disks 33 are employed their edges are serrated or otherwise roughened, although shown plain in the drawings.

The carrying-roll D occupies a central position in the frame A, being also below the heating-roll C and in front of the releasing-roll. The carrying-roll D consists of a tubular body 35, secured at each end to a head 36, as shown in Fig. 3. A shaft 37 is passed through the heads 36, the outer ends 38 of the shaft 37 being preferably of less diameter than the diameter of the body portion of the shaft. The body portion of the carrying-roll D is arranged to receive at each of its ends a cap 39, the caps being held in position by nuts 40, screwed upon the outer ends of the body portion of the shaft 37, as is also shown in Fig. 3.

The ends 38 of the shaft 37 are journaled in bearing 41, located in the frame, the bearings being removable at the rear portion of the frame, and the bearings 41 are held in place by plates 42, slid in suitable recesses in the frame, and by set-screws 43, passed through said plates to an engagement with said bearings, as shown in dotted lines in Figs. 1ª and 2.

Dovetail grooves 44 are longitudinally made in the outer surface of the body of the carrying-roll D, as shown in Figs. 1ª and 4. The body of the carrying-roll is adapted to receive a series of saws 45 or serrated rings adapted to remove the seeds from the raisins. These saws or serrated rings are preferably made in segments, as shown in Figs. 1ª and 4, and each segment is provided with a dovetail lug 47, adapted to enter one of the dovetailed grooves 44 in the body of the carrying-roll, and each segment is also preferably provided with a dovetail groove 46 at one end and a dovetail projection 46ª at the opposite end, as also shown in Fig. 4, so that the various segments of a saw or serrated ring may be firmly, conveniently, and expeditiously connected to form a circle. The object of constructing the saws in segments is to save expense in replacing damaged sections of the saws, since should a break occur in any segment of any saw such segment may be removed and replaced by a perfect section, thus obviating the necessity of substituting a complete perfect saw.

The disks 33 of the releasing-roll enter between the saws or serrated rings 45 of the carrying-roll, and the said saws or rings are suitably spaced by washers 48, as shown in Fig. 3, and the saws and washers are firmly held upon the body of the carrying-roll by the caps 39, which caps engage with the outermost saws on the roll. Immediately below the carrying-roll D a shaft 49 is journaled in the frame A, the longitudinal axis of the shaft 49 being in vertical alinement with the longitudinal axis of the shaft 37 of said carrying-roll. The shaft 49 is provided with a longitudinal keyway 50, as shown in Figs. 1ª and 5, and the said shaft 49 carries a series of brushes. The brushes consist of metal disks 51, arranged to slide upon the shaft 49, each disk being provided with peripheral teeth and with a suitable projection arranged to enter the keyway of the shaft 49. The serrated disk brushes 51 are separated by washers 52, the separation of the serrated disk brushes being such that the said brushes will be beneath the toothed portion of saws on the carrying-roll D. The hub portion 53 of a stripper 54 is loosely mounted upon each of the washers 52, the hubs of the strippers being of less transverse thickness than the transverse thickness of the washers, and the strippers 54, projected from the hubs 53, consist of downwardly-curved arms, as shown in Fig. 1ᵃ, which arms bear against a rod 55, extending from side to side of the frame at the rear of the strippers. Thus it will be observed that the shaft 49 will revolve while the strippers 54 remain stationary.

The disk brushes and washers are held on the shaft 49 by means of lock-nuts 56, screwed upon said shaft, and the ends of the shaft are journaled in boxes 57, located in the frame A, which boxes are vertically adjustable, so that the disk brushes may be carried toward or from the saws of the carrying-roll. The shaft 49, provided with the disk brushes, revolves in the same direction as the shaft 37 of the carrying-roll, as indicated by the arrows in Fig. 1ᵃ; but at the point where the peripheries of the disks 51 and saws 45 oppose each other said disks and saws move in opposite directions. The shaft 31 of the releasing-roll and the shafts 37 and 49, provided for the carrying-roll and disk brushes, may be driven in any desired manner.

A series of shafts 59 is grouped around the carrying-roll, the uppermost shaft being adjacent to the heating-roll C and the lower shaft 59 being opposite to the front central portion of the carrying-roll. A roller 58 is mounted to revolve with each shaft 59, and each shaft 59 is received by boxes 60, adjustably mounted in the frame A, the adjustment of said boxes 60 being accomplished through the medium of set-screws 61 or their equivalents. The rollers 58 may be provided with resilient surfaces.

The compressing-roller 58, adjacent to the roll or drum C, is so placed that the raisins delivered to said roll or drum C from the screen B' or other source of supply will pass between the upper compressing-roller 58 and said roll or drum C. This roll or drum C, which constitutes, primarily, a press-roll and which I prefer to heat, as stated, acts in conjunction with the upper compressing-roller 58 or any equivalent of such roller and subjects the raisins to heat, flattens the same without the aid of adventitious moisture, pushes the pulp away from the seeds, and so prepares the raisins that one impression of the impaling or carrying roll D will break the skins and leave the seeds exposed, so that the brushes 51 can readily strip the seeds from the impaling-roll, while the seeded raisins may be removed from the impaling-roll by any desired form of releasing device. The addition of heat to the press-roll C contributes to the end desired, and for this reason the heat is preferable.

In the operation of the machine the raisins to be seeded are placed in the hopper without being steamed, or, if desired, without having been subjected to the action of water and are fed by the drum 12 to the screen B', the said screen serving to separate the extraneous matter from the fruit, as stated. The raisins are delivered by the screen to the heating-roll C, where they are softened by contact with said roll, and the raisins then pass between the heating-roll C and adjacent pressure-roll 58 and fall upon the carrying-roll D. The raisins are forced by the pressure-rolls into the spaces between the saw-sections of the carrying-roll and the seeds of the raisins will be received by the teeth of said saw-sections. As the carrying-roll continues to revolve the raisin-seeds are removed from the teeth of the saw-sections of the carrying-roll by the serrated disk brushes 51 and the seeds are removed from these disk brushes by the strippers 54, the seeds falling to the floor or support upon which the machine is placed or into a receptacle provided to receive them. The raisins continue on the carrying-roll until they are met by the disks 33 of the releasing-roll, which disks act to remove the seeded raisins from the carrying-roll, the seeded raisins dropping downward at the rear of the machine.

Having thus described my invention, I claim as new and desire to secure by Letters Patent—

1. In a raisin-seeder, a heating-roll adapted to receive the raisins to be seeded, a carrying-roll arranged to receive the raisins from the heating-roll, the carrying-roll being provided with peripherally-toothed rings held separated, brushes located adjacent to the carrying-roll, and adapted to take the seeds from said roll, and a device for removing the raisins from the carrying-roll, as described.

2. In a raisin-seeder, a heating-roll adapted to receive the raisins to be seeded, a carrying-roll arranged to receive the raisins from the heating-roll, the carrying-roll being provided with spaced peripherally-toothed rings, pressure-rolls arranged adjacent to the heating-roll and around the carrying-roll, brushes located adjacent to the carrying-roll and adapted to take the seeds therefrom, strippers for the brushes, and means for removing the seeded raisins from the carrying-roll, as specified.

3. In a raisin-seeder or a like machine, a hopper, a drum located within the hopper, and mounted to revolve therein, means for regulating the supply of material to the drum, a screen having swinging support, one end of which screen is adapted to travel beneath the drum, the screen being provided with a slotted bottom, pitmen connected with supports for the said screen and with cranks attached to said drum, a receiving-roller located at the outlet end of the screen, and means for supplying heat to the receiving-roller, said roller being adapted to convey the raisins to a seeding device, for the purpose specified.

4. In a raisin-seeder, the combination, with a feed device and a seeding device, of a heating-roll located between the two devices, as described.

5. In a raisin-seeder, the combination, with a feeding device and a seeding device, of a heating-roll located between the two devices, and pressure-rolls arranged around the seeding device and adjacent to the heating-roll, as and for the purpose specified.

6. In a seeder, a carrying-roll for fruit, brushes independent of and rotating adjacent to said roll, acting to remove the seed from the roll, strippers in connection with the rotating brushes, and rotating disks intercurrent with the members of the carrying-roll and adapted to remove the seeded raisins from the carrying-roll, said raisin-removing device being independent of the carrying-roll, and independent of said brushes, as described.

CARY S. COX.

Witnesses:
T. E. LANGLEY,
S. L. HOGUE.